March 14, 1933.                  G. B. COE                    1,901,286
                               ROD COUPLING
                           Filed March 14, 1931
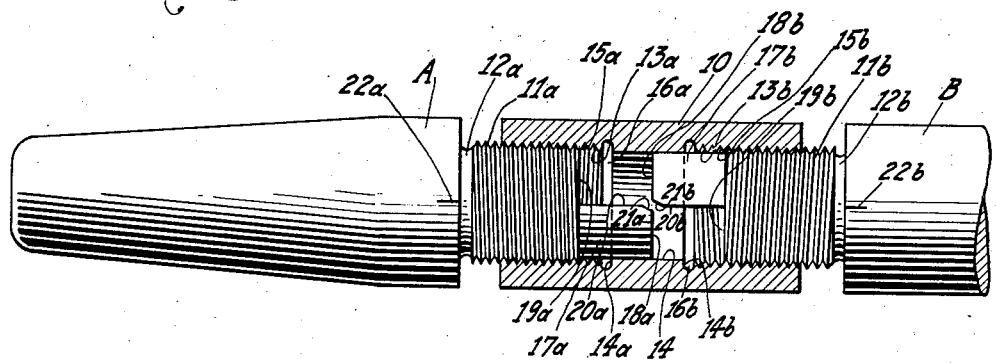
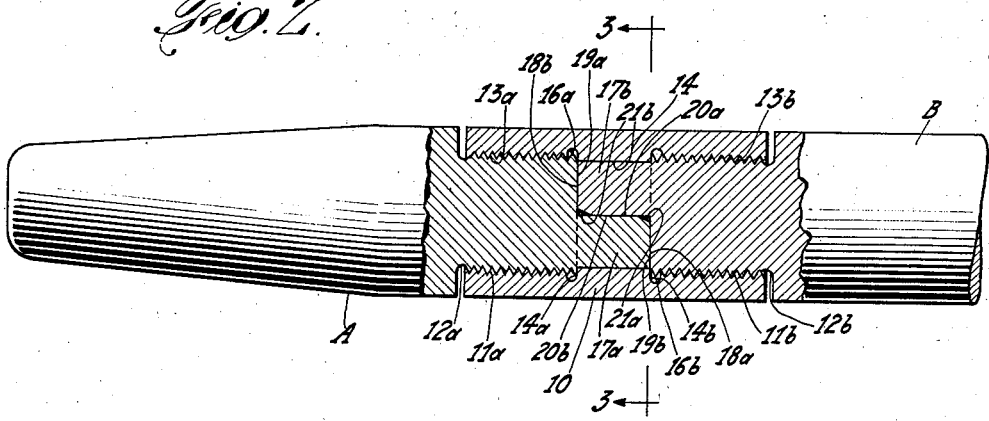
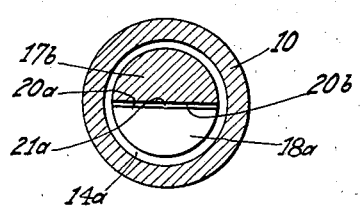
Inventor
George B. Coe
By his Attorneys
Emery, Booth, Varney & Whittemore Patented Mar. 14, 1933

1,901,286

UNITED STATES PATENT OFFICE

GEORGE B. COE, OF MONTCLAIR, NEW JERSEY, ASSIGNOR, BY MESNE ASSIGNMENTS, TO TUBE REDUCING CORPORATION, OF WILMINGTON, DELAWARE, A CORPORATION OF DELAWARE

ROD COUPLING

Application filed March 14, 1931. Serial No. 522,535.

The present invention relates to a coupling for rods and is particularly intended for a mandrel upon which tubular stock is reduced by devices acting intermittently upon successive increments of length. In such machines the mandrel receives sudden end thrusts and rotative impulses of considerable magnitude and the coupling must absolutely prevent relative movement between the parts which are coupled. Of course, the invention is not limited to use in this capacity but may be used for any other purposes for which it is adapted.

The nature and objects of the invention will be understood from the following description of an exemplary embodiment thereof, reference being made throughout the description to the accompanying drawing, wherein:

Figure 1 is a longitudinal section showing the parts at one stage of assembly;

Figure 2 is a similar section showing the parts in final assembled condition; and Figure 3 is a transverse section on the line 3—3 of Fig. 2.

The sleeve 10 connects the hardened working portion of the mandrel A with the tail portion of the mandrel B. The parts connected may obviously be other than mandrel parts.

The mandrel parts are provided with round threaded portions 11a, 11b leaving unthreaded portions 12a, 12b on the ends adjacent the large stock. The threaded portions 11a, 11b are enough smaller than the large stock to receive the sleeve 10 so that its outer surface is about even with the outer surfaces of the mandrel parts. The sleeve has threaded portions 13a, 13b corresponding to and engaging the threaded portions 11a, 11b of the mandrel parts.

Centrally the sleeve is provided with an annular abutment 14 smaller in interior diameter than the outside diameter of the threaded portions 11a, 11b of the mandrel parts in order that the abutment faces 14a, 14b of the abutment may come against the stop faces 15a, 15b at the adjacent or inner ends of the threaded portions of the mandrel parts. There are unthreaded portions 16a, 16b provided at either end of the abutment 14.

Beyond the threaded portions 11a, 11b the mandrel parts are provided with semi-cylindrical or otherwise shaped splines 17a, 17b, the outer end faces 18a, 18b of which abut the notched faces 19a, 19b at the ends of the threaded portions when the parts are fully assembled. The diametral faces 20a, 20b of the splines 17a, 17b may be slightly beveled at their ends as indicated by 21a, 21b to assist the assembling of the parts.

Reference marks 22a, 22b may be made on the large stock where the plane of the diametral faces 20a, 20b cuts the circumference thereof to assist in getting the parts in mating position. They cannot be observed when within the sleeve.

To assemble the parts, the sleeve 10 is screwed onto one of the threaded portions 11a or 11b, say 11a, of the part A, until the end face 18a of the splined portion is almost at the mid-point of the length of the sleeve. The threaded portion 11b of the other part B is then threaded in the sleeve for the same distance. The marks 22a and 22b are aligned with each other to insure movement of the splines 17a, 17b past each other. The parts A and B are then gripped while the sleeve 10 is screwed up until tight, the threads at each end being right and left hand respectively for this purpose. When the parts are fully assembled the stop faces 15a, 15b are tight against the abutment faces 14a, 14b of the abutment 14 and the end faces 18a, 18b of the splines are substantially tight against the notched faces 19a, 19b. There is a slight space left between the ends of the sleeve and the ends of the large parts A and B of the mandrel.

When assembled the parts cannot be moved except by reversing the assembling procedure. Neither of the parts A or B can be turned relative to the other, nor can the sleeve be turned relative to either part alone. Furthermore, the provision of the abutment 14 and related abutting faces and the discontinuance of the threads at the center of the coupling prevents the stripping of threads to release the parts or the locking of them together as often occurs where the right and left hand threads run together at the center of the sleeve.

While one embodiment of the invention has been described in detail for illustration, it is to be understood that the invention is not to be limited except by the prior art and the scope of the subjoined claims.

What I claim is:

1. A rod coupling comprising in combination, rod parts A and B to be coupled, a sleeve 10 of approximately the same outside diameter as said rod parts for coupling the same, reduced oppositely threaded portions 11a, 11b on the rod parts ending in unthreaded portions 12a, 12b adjacent the large portion of the rod parts, mating splined portions 17a, 17b without threads and of less diameter than the threaded portions at the inner ends of the rod parts leaving abutment faces 15a, 15b at the inner ends of the threaded portions, oppositely threaded portions 13a, 13b at each end of said sleeve ending in unthreaded portions 16a, 16b, an internal annular abutment rib 14 of less internal diameter than the threaded portions of the sleeve located between the unthreaded portions of the sleeve, and faces 14a, 14b on the abutment rib cooperating with the faces 15a, 15b on said rod parts to lock the parts together when assembled.

2. A rod coupling comprising in combination, oppositely threaded rod parts having reduced complementary unthreaded splined portions at their inner ends and flat annular abutment faces disposed in planes normal to the axis, and a sleeve having oppositely threaded end portions and an internal annular abutment rib of less internal diameter than the threaded portions said rib being provided with flat annular abutment faces disposed in planes normal to the axis for cooperating with the faces of the rod parts to lock the parts together when assembled.

In testimony whereof, I have signed my name to this specification this 13th day of March, 1931.

GEORGE B. COE.